US010567492B1

(12) United States Patent
Natarajan et al.

(10) Patent No.: US 10,567,492 B1
(45) Date of Patent: Feb. 18, 2020

(54) METHODS FOR LOAD BALANCING IN A FEDERATED IDENTITY ENVIRONMENT AND DEVICES THEREOF

(71) Applicant: F5 Networks, Inc., Seattle, WA (US)

(72) Inventors: Ravi Natarajan, Fremont, CA (US); Saxon Amdahl, Portola Valley, CA (US)

(73) Assignee: F5 Networks, Inc., Seattle, WA (US)

( * ) Notice: Subject to any disclaimer, the term of this patent is extended or adjusted under 35 U.S.C. 154(b) by 101 days.

(21) Appl. No.: 15/861,910

(22) Filed: Jan. 4, 2018

Related U.S. Application Data

(60) Provisional application No. 62/504,664, filed on May 11, 2017.

(51) Int. Cl.
| G06F 15/173 | (2006.01) |
| H04L 29/08 | (2006.01) |
| H04L 9/32 | (2006.01) |
| H04L 29/06 | (2006.01) |

(52) U.S. Cl.
CPC ........ H04L 67/1008 (2013.01); H04L 9/3213 (2013.01); H04L 63/0807 (2013.01); H04L 67/1021 (2013.01); H04L 67/1036 (2013.01)

(58) Field of Classification Search
CPC ............... H04L 67/1008; H04L 9/3213; H04L 67/1021; H04L 67/1036
USPC ....................................................... 709/226
See application file for complete search history.

(56) References Cited

U.S. PATENT DOCUMENTS

| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |

(Continued)

FOREIGN PATENT DOCUMENTS

| AU | 2003300350 A1 | 7/2004 |
| CA | 2080530 A1 | 4/1994 |

(Continued)

OTHER PUBLICATIONS

"Ankeena is now part of Juniper Networks," Obtained from http://www.ankeena.com/technology (Jun. 2, 2010).

(Continued)

*Primary Examiner* — Hee Soo Kim
(74) *Attorney, Agent, or Firm* — Pepper Hamilton LLP

(57) ABSTRACT

Methods, non-transitory computer readable media, network traffic management apparatuses, and network traffic management systems performing load balancing in a federated identity environment. An enhanced identity service provider server receives a redirected user authentication from a client device. Upon successfully authenticating the user of the client device a token is generated. Further another service provider server is selected based on a comparison of one or more network parameters and the client device is redirected with the token to the another selected service provider server. Based on a validation of the token the client device accesses applications protected by the selected another service provider server.

20 Claims, 4 Drawing Sheets

(56) References Cited

U.S. PATENT DOCUMENTS

| | | | |
|---|---|---|---|
| 5,583,995 | A | 12/1996 | Gardner et al. |
| 5,586,260 | A | 12/1996 | Hu |
| 5,590,320 | A | 12/1996 | Maxey |
| 5,623,490 | A | 4/1997 | Richter et al. |
| 5,649,194 | A | 7/1997 | Miller et al. |
| 5,649,200 | A | 7/1997 | Leblang et al. |
| 5,668,943 | A | 9/1997 | Attanasio et al. |
| 5,692,180 | A | 11/1997 | Lee |
| 5,721,779 | A | 2/1998 | Funk |
| 5,724,512 | A | 3/1998 | Winterbottom |
| 5,806,061 | A | 9/1998 | Chaudhuri et al. |
| 5,832,496 | A | 11/1998 | Anand et al. |
| 5,832,522 | A | 11/1998 | Blickenstaff et al. |
| 5,838,970 | A | 11/1998 | Thomas |
| 5,862,325 | A | 1/1999 | Reed et al. |
| 5,884,303 | A | 3/1999 | Brown |
| 5,893,086 | A | 4/1999 | Schmuck et al. |
| 5,897,638 | A | 4/1999 | Lasser et al. |
| 5,905,990 | A | 5/1999 | Inglett |
| 5,917,998 | A | 6/1999 | Cabrera et al. |
| 5,920,873 | A | 7/1999 | Van Huben et al. |
| 5,926,816 | A | 7/1999 | Bauer et al. |
| 5,937,406 | A | 8/1999 | Balabine et al. |
| 5,991,302 | A | 11/1999 | Berl et al. |
| 5,995,491 | A | 11/1999 | Richter et al. |
| 5,999,664 | A | 12/1999 | Mahoney et al. |
| 6,012,083 | A | 1/2000 | Savitsky et al. |
| 6,029,168 | A | 2/2000 | Frey |
| 6,044,367 | A | 3/2000 | Wolff |
| 6,047,129 | A | 4/2000 | Frye |
| 6,072,942 | A | 6/2000 | Stockwell et al. |
| 6,078,929 | A | 6/2000 | Rao |
| 6,085,234 | A | 7/2000 | Pitts et al. |
| 6,088,694 | A | 7/2000 | Burns et al. |
| 6,104,706 | A | 8/2000 | Richter et al. |
| 6,128,627 | A | 10/2000 | Mattis et al. |
| 6,128,717 | A | 10/2000 | Harrison et al. |
| 6,161,145 | A | 12/2000 | Bainbridge et al. |
| 6,161,185 | A | 12/2000 | Guthrie et al. |
| 6,181,336 | B1 | 1/2001 | Chiu et al. |
| 6,202,156 | B1 | 3/2001 | Kalajan |
| 6,223,206 | B1 | 4/2001 | Dan et al. |
| 6,233,648 | B1 | 5/2001 | Tomita |
| 6,237,008 | B1 | 5/2001 | Beal et al. |
| 6,256,031 | B1 | 7/2001 | Meijer et al. |
| 6,282,610 | B1 | 8/2001 | Bergsten |
| 6,289,345 | B1 | 9/2001 | Yasue |
| 6,308,162 | B1 | 10/2001 | Ouimet et al. |
| 6,324,581 | B1 | 11/2001 | Xu et al. |
| 6,329,985 | B1 | 12/2001 | Tamer et al. |
| 6,339,785 | B1 | 1/2002 | Feigenbaum |
| 6,349,343 | B1 | 2/2002 | Foody et al. |
| 6,374,263 | B1 | 4/2002 | Bunger et al. |
| 6,389,433 | B1 | 5/2002 | Bolosky et al. |
| 6,393,581 | B1 | 5/2002 | Friedman et al. |
| 6,397,246 | B1 | 5/2002 | Wolfe |
| 6,412,004 | B1 | 6/2002 | Chen et al. |
| 6,438,595 | B1 | 8/2002 | Blumenau et al. |
| 6,466,580 | B1 | 10/2002 | Leung |
| 6,469,983 | B2 | 10/2002 | Narayana et al. |
| 6,477,544 | B1 | 11/2002 | Bolosky et al. |
| 6,487,561 | B1 | 11/2002 | Ofek et al. |
| 6,493,804 | B1 | 12/2002 | Soltis et al. |
| 6,516,350 | B1 | 2/2003 | Lumelsky et al. |
| 6,516,351 | B2 | 2/2003 | Borr |
| 6,542,909 | B1 | 4/2003 | Tamer et al. |
| 6,549,916 | B1 | 4/2003 | Sedlar |
| 6,553,352 | B2 | 4/2003 | Delurgio et al. |
| 6,556,997 | B1 | 4/2003 | Levy |
| 6,556,998 | B1 | 4/2003 | Mukherjee et al. |
| 6,560,230 | B1 | 5/2003 | Li et al. |
| 6,601,101 | B1 | 7/2003 | Lee et al. |
| 6,606,663 | B1 | 8/2003 | Liao et al. |
| 6,612,490 | B1 | 9/2003 | Herrendoerfer et al. |
| 6,654,346 | B1 | 11/2003 | Mahalingaiah et al. |
| 6,721,794 | B2 | 4/2004 | Taylor et al. |
| 6,728,265 | B1 | 4/2004 | Yavatkar et al. |
| 6,775,672 | B2 | 4/2004 | Mahalingam et al. |
| 6,738,357 | B1 | 5/2004 | Richter et al. |
| 6,738,790 | B1 | 5/2004 | Klein et al. |
| 6,742,035 | B1 | 5/2004 | Zayas et al. |
| 6,744,776 | B1 | 6/2004 | Kalkunte et al. |
| 6,748,420 | B1 | 6/2004 | Quatrano et al. |
| 6,754,215 | B1 | 6/2004 | Arikawa et al. |
| 6,757,706 | B1 | 6/2004 | Dong et al. |
| 6,775,673 | B2 | 8/2004 | Mahalingam et al. |
| 6,775,679 | B2 | 8/2004 | Gupta |
| 6,782,450 | B2 | 8/2004 | Arnott et al. |
| 6,801,960 | B1 | 10/2004 | Ericson et al. |
| 6,826,613 | B1 | 11/2004 | Wang et al. |
| 6,839,761 | B2 | 1/2005 | Kadyk et al. |
| 6,847,959 | B1 | 1/2005 | Arrouye et al. |
| 6,847,970 | B2 | 1/2005 | Keller et al. |
| 6,850,997 | B1 | 2/2005 | Rooney et al. |
| 6,871,245 | B2 | 3/2005 | Bradley |
| 6,880,017 | B1 | 4/2005 | Marce et al. |
| 6,889,249 | B2 | 5/2005 | Miloushev et al. |
| 6,914,881 | B1 | 7/2005 | Mansfield et al. |
| 6,922,688 | B1 | 7/2005 | Frey, Jr. |
| 6,934,706 | B1 | 8/2005 | Mancuso et al. |
| 6,938,039 | B1 | 8/2005 | Bober et al. |
| 6,938,059 | B2 | 8/2005 | Tamer et al. |
| 6,959,373 | B2 | 10/2005 | Testardi |
| 6,961,815 | B2 | 11/2005 | Kistler et al. |
| 6,973,455 | B1 | 12/2005 | Vahalia et al. |
| 6,973,549 | B1 | 12/2005 | Testardi |
| 6,975,592 | B1 | 12/2005 | Seddigh et al. |
| 6,985,936 | B2 | 1/2006 | Agarwalla et al. |
| 6,985,956 | B2 | 1/2006 | Luke et al. |
| 6,986,015 | B2 | 1/2006 | Testardi |
| 6,990,114 | B1 | 1/2006 | Erimli et al. |
| 6,990,547 | B2 | 1/2006 | Ulrich et al. |
| 6,990,667 | B2 | 1/2006 | Ulrich et al. |
| 6,996,841 | B2 | 2/2006 | Kadyk et al. |
| 7,003,533 | B2 | 2/2006 | Noguchi et al. |
| 7,006,981 | B2 | 2/2006 | Rose et al. |
| 7,010,553 | B2 | 3/2006 | Chen et al. |
| 7,013,379 | B1 | 3/2006 | Testardi |
| 7,020,644 | B2 | 3/2006 | Jameson |
| 7,020,669 | B2 | 3/2006 | McCann et al. |
| 7,024,427 | B2 | 4/2006 | Bobbitt et al. |
| 7,039,061 | B2 | 5/2006 | Connor et al. |
| 7,051,112 | B2 | 5/2006 | Dawson |
| 7,054,998 | B2 | 5/2006 | Arnott et al. |
| 7,072,917 | B2 | 7/2006 | Wong et al. |
| 7,075,924 | B2 | 7/2006 | Richter et al. |
| 7,089,286 | B1 | 8/2006 | Malik |
| 7,111,115 | B2 | 9/2006 | Peters et al. |
| 7,113,962 | B1 | 9/2006 | Kee et al. |
| 7,120,728 | B2 | 10/2006 | Krakirian et al. |
| 7,120,746 | B2 | 10/2006 | Campbell et al. |
| 7,127,556 | B2 | 10/2006 | Blumenau et al. |
| 7,133,967 | B2 | 11/2006 | Fujie et al. |
| 7,143,146 | B2 | 11/2006 | Nakatani et al. |
| 7,146,524 | B2 | 12/2006 | Patel et al. |
| 7,152,184 | B2 | 12/2006 | Maeda et al. |
| 7,155,466 | B2 | 12/2006 | Rodriguez et al. |
| 7,165,095 | B2 | 1/2007 | Sim |
| 7,167,821 | B2 | 1/2007 | Hardwick et al. |
| 7,171,469 | B2 | 1/2007 | Ackaouy et al. |
| 7,173,929 | B1 | 2/2007 | Testardi |
| 7,194,579 | B2 | 3/2007 | Robinson et al. |
| 7,234,074 | B2 | 6/2007 | Cohn et al. |
| 7,236,491 | B2 | 6/2007 | Tsao et al. |
| 7,280,536 | B2 | 10/2007 | Testardi |
| 7,284,150 | B2 | 10/2007 | Ma et al. |
| 7,293,097 | B2 | 11/2007 | Borr |
| 7,293,099 | B1 | 11/2007 | Kalajan |
| 7,293,133 | B1 | 11/2007 | Colgrove et al. |
| 7,343,351 | B1 | 3/2008 | Bishop et al. |
| 7,343,398 | B1 | 3/2008 | Lownsbrough |
| 7,346,664 | B2 | 3/2008 | Wong et al. |
| 7,383,288 | B2 | 6/2008 | Miloushev et al. |
| 7,401,220 | B2 | 7/2008 | Bolosky et al. |

(56) References Cited

U.S. PATENT DOCUMENTS

| | | |
|---|---|---|
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,146 B2 | 1/2009 | Bazot et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,711,771 B2 | 5/2010 | Kirnos |
| 7,734,603 B1 | 6/2010 | McManis |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,793,342 B1 | 9/2010 | Ebrahimi et al. |
| 7,809,691 B1 | 10/2010 | Karmarkar et al. |
| 7,818,299 B1 | 10/2010 | Federwisch et al. |
| 7,822,939 B1 | 10/2010 | Veprinsky et al. |
| 7,831,639 B1 | 11/2010 | Panchbudhe et al. |
| 7,836,493 B2 | 11/2010 | Xia et al. |
| 7,849,112 B2 | 12/2010 | Mane et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,904,466 B1 | 3/2011 | Valencia et al. |
| 7,913,053 B1 | 3/2011 | Newland |
| 7,953,701 B2 | 5/2011 | Okitsu et al. |
| 7,958,347 B1 | 6/2011 | Ferguson |
| 8,005,953 B2 | 8/2011 | Miloushev et al. |
| 8,046,547 B1 | 10/2011 | Chatterjee et al. |
| 8,103,622 B1 | 1/2012 | Karinta |
| 8,112,392 B1 | 2/2012 | Bunnell et al. |
| 8,140,695 B2 * | 3/2012 | Nusbickel ............ H04L 67/1008 370/352 |
| 8,271,751 B2 | 9/2012 | Hinrichs, Jr. |
| 8,326,798 B1 | 12/2012 | Driscoll et al. |
| 8,351,600 B2 | 1/2013 | Resch |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0188667 A1 | 12/2002 | Kirnos |
| 2002/0194342 A1 | 12/2002 | Lu et al. |
| 2003/0005280 A1 | 1/2003 | Bobde et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0135514 A1 | 7/2003 | Patel et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0133652 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probed et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0161518 A1 | 7/2006 | Lacapra |
| 2006/0167838 A1 | 7/2006 | Lacapra |

(56) References Cited

U.S. PATENT DOCUMENTS

| | | |
|---|---|---|
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0053297 A1 | 3/2007 | Wu et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0139227 A1 | 6/2007 | Speirs, II et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0021866 A1* | 1/2008 | Hinton ............... G06Q 10/10 |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0114718 A1 | 5/2008 | Anderson et al. |
| 2008/0189468 A1 | 8/2008 | Schmidt et al. |
| 2008/0200207 A1 | 8/2008 | Donahue et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0013138 A1 | 1/2009 | Sudhakar |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0210875 A1 | 8/2009 | Bolles et al. |
| 2009/0240705 A1 | 9/2009 | Miloushev et al. |
| 2009/0240899 A1 | 9/2009 | Akagawa et al. |
| 2009/0254592 A1 | 10/2009 | Marinov et al. |
| 2009/0265396 A1 | 10/2009 | Ram et al. |
| 2010/0017643 A1 | 1/2010 | Baba et al. |
| 2010/0077294 A1 | 3/2010 | Watson |
| 2010/0082542 A1 | 4/2010 | Feng et al. |
| 2010/0205206 A1 | 8/2010 | Rabines et al. |
| 2010/0211547 A1 | 8/2010 | Kamei et al. |
| 2010/0325634 A1 | 12/2010 | Ichikawa et al. |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0320882 A1 | 12/2011 | Beaty et al. |
| 2012/0144229 A1 | 6/2012 | Nadolski |
| 2012/0150699 A1 | 6/2012 | Trapp et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 6-332782 A | 12/1994 |
| JP | 8021924 B | 3/1996 |
| JP | 08-328760 A | 12/1996 |
| JP | 08-339355 | 12/1996 |
| JP | 9016510 A | 1/1997 |
| JP | 11282741 A1 | 10/1999 |
| JP | 2000-183935 | 6/2000 |
| NZ | 566291 A | 12/2008 |
| WO | WO 02/39696 A2 | 5/2002 |
| WO | WO 02/056181 A2 | 7/2002 |
| WO | WO 2004/061605 A2 | 7/2004 |
| WO | WO 2006091040 A1 | 8/2006 |
| WO | WO 2008/130983 A1 | 10/2008 |
| WO | WO 2008/147973 A2 | 12/2008 |

OTHER PUBLICATIONS

"Auspex Storage Architecture Guide," Second Edition, 2001, Auspex Systems, Inc., www.auspex.com, last accessed on Dec. 30, 2002.

"CSA Persistent File System Technology," Colorado Software Architecture, Inc.: A White Paper, Jan. 1, 1999, p. 1-3, <http://www.cosoa.com/white_papers/pfs.php>.

"Deploying the BIG-IP LTM With Multiple BIG-IP AAM and ASM Devices", Deployment Guide, F5 Networks, Inc., Feb. 4, 2015, pp. 1-14.

"Distributed File System: Logical View of Physical Storage: White Paper," 1999, Microsoft Corp., www.microsoft.com <http://www.eu.microsoft.com/TechNet/prodtechnol/windows2000serv/maintain/DFSnt95>, pp. 1-26, last accessed on Dec. 20, 2002.

"How DFS Works: Remote File Systems," Distributed File System (DFS) Technical Reference, retrieved from the Internet on Feb. 13, 2009: URL:http://technetmicrosoft.com/en-us/library/cc782417.aspx>(2003).

"NERSC Tutorials: I/O on the Cray T3E," chapter 8, "Disk Striping," National Energy Research Scientific Computing Center (NERSC), http://hpcf.nersc.gov, last accessed on Dec. 27, 2002.

"Scaling Next Generation Web Infrastructure with Content-Intelligent Switching : White Paper," Apr. 2000, Alteon WebSystems, Inc., (now Nortel Networks).

"The AFS File System in Distributed Computing Environment," www.transarc.ibm.com/Library/whitepapers/AFS/afsoverview.html, last accessed on Dec. 20, 2002.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

"Welcome to the RSYNC Web Pages," Retrieved from the Internet URL: http://samba.anu.edu.au/rsync/ (Retrieved on Dec. 18, 2009).

"Windows Clustering Technologies—An Overview," Nov. 2000.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson et al., "Serverless Network File System," in the 15th Symposium on Operating Systems Principles, Dec. 1995, Association for Computing Machinery, Inc.

Anderson, Darrell C. et al., "Interposed Request Routing for Scalable Network Storage," ACM Transactions on Computer Systems 20(1):1-24 (Feb. 2002).

(56) References Cited

OTHER PUBLICATIONS

Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-11.
Apple, Inc., Transcription of "Mac Os X Keynote Intro. Part 2" Jun. 2004, www.youtube.com http://www.youtube.com/watch?v=zSBJwEmRJbY, (with snapshots) pp. 1-6.
Basney, Jim et al., "Credential Wallets: A Classification of Credential Repositories Highlighting MyProxy," TPRC 2003, Sep. 19-21, 2003.
Botzum, Keys, "Single Sign on—A Contrarian View," Open Group Website, <http://www.opengroup.org/security/topics.htm>, Aug. 6, 2001, pp. 1-5.
Cabrera et al., "Swift: A Storage Architecture for Large Objects," In Proceedings of the-Eleventh IEEE Symposium on Mass Storage Systems, 7 pages, Oct 1991.
Cabrera et al., "Swift: Using Distributed Disk Striping to Provide High I/O Data Rates," Computing Systems 4(4):405-436 (Fall 1991).
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN).
Carns et al., "PVFS: A Parallel File System for Linux Clusters," in Proceedings of the Extreme Linux Track: 4th Annual Linux Showcase and Conference, pp. 317-327, Atlanta, Georgia, Oct. 2000, USENIX Association.
Cavale, M. R., "Introducing Microsoft Cluster Service (MSCS) in the Windows Server 2003", Microsoft Corporation, Nov. 2002.
English Language Abstract of JP 08-328760 from Patent Abstracts of Japan, published Dec. 13, 1996.
English Language Abstract of JP 08-339355 from Patent Abstracts of Japan, published Dec. 24, 1996.
English Translation of Notification of Reason(s) for Refusal for JP 2002-556371 (Dispatch Date: Jan. 22, 2007).
English Translation of paragraphs 17, 32, and 40-52 of JP 08-328760, published Dec. 13, 1996.
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks," Jan. 2000, McGraw Hill, ISBN 0072120509.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.
Gibson et al., "NASD Scalable Storage Systems," Jun. 1999, USENIX99, Extreme Linux Workshop, Monterey, California.
Gupta et al., "Algorithms for Packet Classification", Computer Systems Laboratory, Stanford University, CA, Mar./Apr. 2001, pp. 1-29.
Harrison, C., Copy of May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1996, in proceedings of IEEE, Spring COMPCON, Santa Clara, CA, www.research.ibm.com, last accessed on Dec. 30, 2002.
Heinz II G., "Priorities in Stream Transmission Control Protocol (SCTP) Multistreaming", Thesis submitted to the Faculty of the University of Delaware, Spring 2003, pp. 1-35.
Hu, J., Final Office action dated Sep. 21, 2007 for related U.S. Appl. No. 10/336,784.
Hu, J., Office action dated Feb. 6, 2007 for related U.S. Appl. No. 10/336,784.
Hwang et al., "Designing SSI Clusters with Hierarchical Checkpointing and Single I/0 Space," IEEE Concurrency, Jan.-Mar. 1999, pp. 60-69.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
International Search Report for International Patent Application No. PCT/US02/00720 dated (Mar. 19, 2003).
International Search Report for International Patent Application No. PCT/US03/41202 dated (Sep. 15, 2005).
International Search Report for International Patent Application No. PCT/US2008/060449 dated (Sep. 4, 2008).
International Search Report for International Patent Application No. PCT/US2008/064677 dated (Jun. 9, 2009).
International Search Report for International Patent Application No. PCT/US 2008/083117 dated (Jun. 23, 2009).
Internet Protocol,"Darpa Internet Program Protocol Specification", (RFC: 791), Information Sciences Institute, University of Southern California, Sep. 1981, pp. 1-49.
Jacobson, Van, "A New Way to look at Networking" Video, Google Tech Talks, Aug. 30, 2006 (http://www.youtube.com/watch?v=oCZMoY3q2uM).
Jacobson, Van, "Introduction to Content Centric Networking," FISS 09, Presentation, Jun. 22, 2009, pp. 1-73, Bremen, Germany.
Karamanolis, C. et al., "An Architecture for Scalable and Manageable File Services," HPL-2001-173, Jul. 26, 2001. p. 1-114.
Katsurashima, W. et al., "NAS Switch: A Novel CIFS Server Virtualization," Proceedings, 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers," 13Th LISA Conf., 1999, pp. 275-282 of the Proceedings.
Klayman, J., response filed by Japanese associate to office action dated Jan. 22, 2007 in corresponding Japanese patent application No. 2002-556371.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993. (http://www.ietf.org/rfc/rfc1510.txt?number=1510.
Korkuzas, V., Communication pursuant to Article 96(2) EPC dated Nov. 9, 2007 in corresponding European patent application No. 02718824.2-2201.
Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, Summer 1994, vol. 7, pp. 333-359.
Modiano E., "Scheduling Algorithms for Message Transmission Over a Satellite Broadcast System," MIT Lincoln Laboratory Advanced Network Group, Nov. 1997, pp. 1-7.
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, Storage Networking Industry Association (SNIA).
Novotny, Jason et al., "An Online Credential Repository for the Grid: MyProxy," 2001, pp. 1-8.
Ott D., et al., "A Mechanism for TCP-Friendly Transport-level Protocol Coordination", USENIX Annual Technical Conference, 2002, University of North Carolina at Chapel Hill, pp. 1-12.

(56) References Cited

OTHER PUBLICATIONS

Padmanabhan V., et al., "Using Predictive Prefetching to Improve World Wide Web Latency", SIGCOM, 1996, pp. 1-15.
Pashalidis, Andreas et al., "A Taxonomy of Single Sign-On Systems," 2003, pp. 249-264, Royal Holloway, University of London, Egham Sunray, TW20, 0EX, United Kingdom.
Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.
Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. of the ACM, Jun. 1990, vol. 33, No. 6.
Peterson, M., "Introducing Storage Area Networks," Feb. 1998, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
Rosen E., et al., "MPLS Label Stack Encoding", (RFC:3032) Network Working Group, Jan. 2001, pp. 1-22, (http://www.ietf.org/rfc/rfc3032.txt).
RSYNC, "Welcome to the RSYNC Web Pages," Retrieved from the Internet URL: http://samba.anu.edu.au/rsync/ (Retrieved on Dec. 18, 2009).
Savage, et al., "AFRAID—A Frequently Redundant Array of Independent Disks," 1996 USENIX Technical Conf., San Diego, California, Jan. 22-26, 1996.
Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).
Soltis et al., "The Global File System," in Proceedings of the Fifth NASA Goddard Space Flight Center Conference on Mass Storage Systems and Technologies, Sep. 17-19, 1996, College Park, Maryland.
Sorenson, K.M., "Installation and Administration: Kimberlite Cluster Version 1.1.0, Rev. D." Mission Critical Linux, Dec. 2000.
Stakutis, C., "Benefits of SAN-based file system sharing," Jul. 2000, InfoStor.
Thekkath et al., "Frangipani: A Scalable Distributed File System," in Proceedings of the 16th ACM Symposium on Operating Systems Principles, Oct. 1997, Association for Computing Machinery, Inc.
Tulloch, Mitch, "Microsoft Encyclopedia of Security," pp. 218, 300-301, Microsoft Press, 2003, Redmond, Washongton.
Wang B., "Priority and Realtime Data Transfer Over the Best-Effort Internet", Dissertation Abstract, Sep. 2005, ScholarWorks@UMASS.
Wikipedia, "Content-centric networking", pp. 1-4, Accessed Nov. 1, 2012, (en.wikipedia.org/wiki/Content-centric_networking).
Wilkes, J., et al., "The HP AutoRAID Hierarchical Storage System," ACM Transactions on Computer Systems, Feb. 1996, vol. 14, No. 1.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Zayas, E., "AFS-3 Programmer's Reference: Architectural Overview," Transarc Corp., version 1.0 of Sep. 2, 1991, doc. No. FS-00-D160.
"Windows Clustering Technologies—An Overview," Nov. 2000, Microsoft Corp., www.microsoft.com, last accessed on Dec. 30, 2002.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.
Callaghan et al., "NFS Version 3 Protocol Specifications" (RFC 1813), Jun. 1995, The Internet Engineering Task Force (IETN), www.ietf.org, last accessed on Dec. 30, 2002.
Harrison, C., May 19, 2008 response to Communication pursuant to Article 96(2) EPC dated Nov. 9, 2007 in corresponding European patent application No. 02718824.2.
Norton et al., "CIFS Protocol Version CIFS-Spec 0.9," 2001, Storage Networking Industry Association (SNIA), www.snia.org, last accessed on Mar. 26, 2001.
Pashalidis, Andreas et al., "A Taxonomy of Single Sign-On Systems," 2003, pp. 1-16, Royal Holloway, University of London, Egham Sunray, TW20, 0EX, United Kingdom.
RSYNC, "Welcome to the RSYNC Web Pages," Retrieved from the Internet URL: http://samba.ami.edu.au/rsync/ (Retrieved on Dec. 18, 2009).
Sorenson, K.M., "Installation and Administration: Kimberlite Cluster Version 1.1.0, Rev. D." Mission Critical Linnux, (no year, month, day) http://oss.missioncriticallinnux.com/kimberlite/kimberlite.pdf, Dec. 2000.
Stakutis, C., "Benefits of SAN-based file system sharing," Jul. 2000, InfoStor, www.infostor.com, last accessed on Dec. 30, 2002.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
Wikipedia, "Content-centric networking", pp. 1-4, 2009, (en.wikipedia.org/wiki/Content-centric_networking).
Zayas, E., "AFS-3 Programmer's Reference: Architectural Overview," Transarc Corp., version 1.0 of Sep. 2, 1991, doc. number FS-00-D160.

* cited by examiner

US 10,567,492 B1

METHODS FOR LOAD BALANCING IN A FEDERATED IDENTITY ENVIRONMENT AND DEVICES THEREOF

This application claims the benefit of U.S. Provisional Patent Application Ser. No. 62/504,664 filed May 11, 2017, which is hereby incorporated by reference in its entirety.

FIELD

This technology generally relates to enterprise networks and, more particularly, to methods and devices for improved workload scheduling.

BACKGROUND

Federated identity environments provide a way of securely exchanging identity information across internet domains. Traditional load balancing enables load distribution, however when applications are deployed in a federated identity environment, then the existing technology does not perform any load balancing. Prior technologies have failed to address the issue of load balancing of user traffic across multiple service provider server devices by selecting a service provider server based on network parameters for servicing the user access request.

SUMMARY

A method for load balancing in a federated identity environment implemented by one or more enhanced identity provider server devices includes receiving a redirected authentication request from a client to access one of a plurality of service provider servers. A token is generated when the authentication request is successfully authenticated. One or more network parameter values of the one of the plurality of service provider server devices are compared against one or more network parameter values associated with each of the other plurality of service provider server devices. One of the other plurality of service provider server devices is selected based on the comparison and one or more selection rules. The client is redirected to the selected one of the other plurality of service provider server devices with the generated token for accessing one or more applications associated with the selected one of the plurality of service provider server devices.

An enhanced identity provider apparatus comprising a memory with programmed instructions stored thereon and one or more processors configured to be capable of executing the stored programmed instructions to receive a redirected authentication request from a client to access one of a plurality of service provider servers. A token is generated when the authentication request is successfully authenticated. One or more network parameter values of the one of the plurality of service provider server devices are compared against one or more network parameter values associated with each of the other plurality of service provider server devices. One of the other plurality of service provider server devices is selected based on the comparison and one or more selection rules. The client is redirected to the selected one of the other plurality of service provider server devices with the generated token for accessing one or more applications associated with the selected one of the plurality of service provider server devices.

A non-transitory computer readable medium having stored thereon instructions for load balancing in a federated identity environment comprising executable code which when executed by one or more processors, causes the one or more processors to receive a redirected authentication request from a client to access one of a plurality of service provider servers. A token is generated when the authentication request is successfully authenticated. One or more network parameter values of the one of the plurality of service provider server devices are compared against one or more network parameter values associated with each of the other plurality of service provider server devices. One of the other plurality of service provider server devices is selected based on the comparison and one or more selection rules. The client is redirected to the selected one of the other plurality of service provider server devices with the generated token for accessing one or more applications associated with the selected one of the plurality of service provider server devices.

This technology has a number of advantages including providing methods, non-transitory computer readable media, and enhanced identity provider apparatus that provides optimized load balancing. With this technology, load balancing of user traffic across multiple service providers is provided to select a service provider server based on multiple parameters for servicing user access request. Additionally, this technology optimizes servicing of requests by selecting a service provider based on the current status of network utilization to provide a more optimal end-user experience.

DETAILED DESCRIPTION

Figure 1:
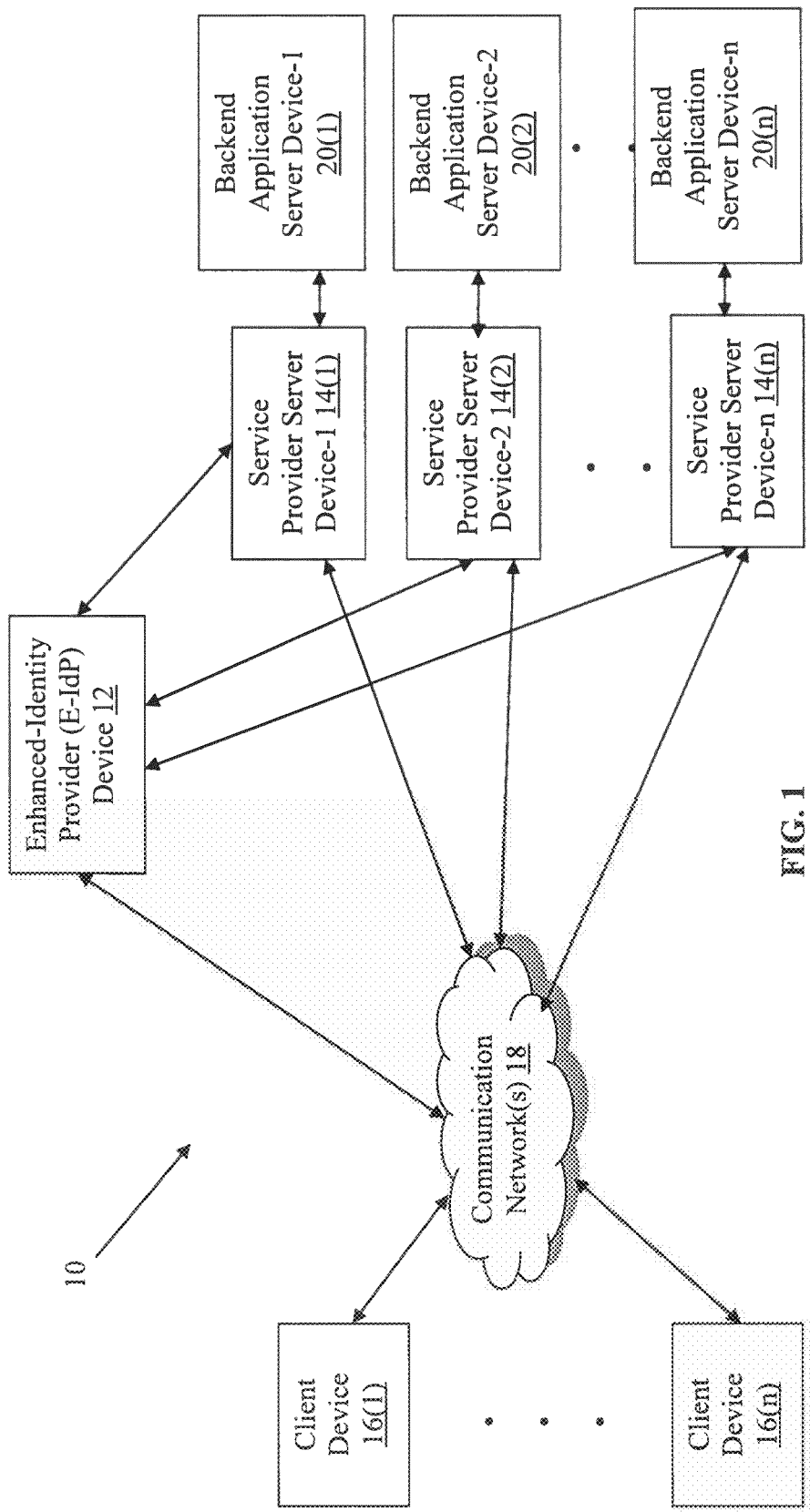
FIG. 1 is a block diagram of an exemplary network environment with an exemplary enhanced identity provider (E-IdP) device.

Referring to FIG. 1, an exemplary network environment which incorporates an exemplary network traffic management system 10 that includes an enhanced identity provider (E-IdP) device 12 to load balance in a federated identity environment is illustrated. The network traffic management system 10 in this example includes an enhanced identity provider (E-IdP) device 12 that is coupled to a plurality of service provider server devices 14(1)-14(n), and each of the plurality of service provider server devices 14(1)-14(n) are coupled to a corresponding backend application server devices 20(1)-20(n) associated with it. Although, the E-IdP device 12, service provider server devices 14(1)-14(n), backend application server devices 20(1)-20(n) and/or client devices 16(1)-16(n) may be coupled together via other topologies. Additionally, the network traffic management system 10 may include other network devices, such as one or more routers and/or switches, for example, which are well known in the art and thus will not be described herein. This technology provides a number of advantages including methods, non-transitory computer readable media, network traffic management systems, and the E-IdP device 12 that collect and monitor current load, health and geographical location for a plurality of service provider server devices. Further advantages include load balancing the user traffic across plurality of service provider server devices for improved availability and manageability of the applications to provide improved availability and manageability of the applications.

Figure 2:
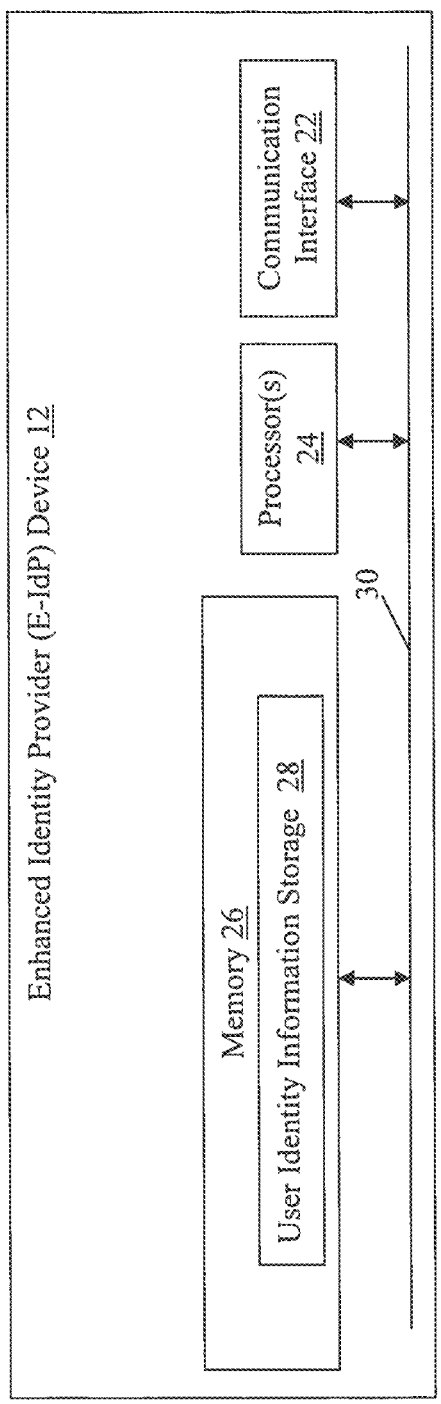
FIG. 2 is a block diagram of the exemplary E-IdP device of FIG. 1.

Referring to FIGS. 1-2, the E-IdP device 12 of the network traffic management system 10 may perform any number of functions including authenticating a request from the client devices 16(1)-16(n) for application access, generating tokens for validation, collecting and monitoring current load, health and geographical location for a plurality of service provider server devices 14(1)-14(n), although other types and/or numbers of other functions may be performed. The E-IdP device 12 performs the function of collection user identity information from the client devices 16(1)-16(n) and authenticating requests. The E-IdP device 12 may function as an access policy management apparatus (APM) to perform functions of managing network traffic, load balancing network traffic across the service provider server devices 14(1)-14(n) as well as functions including authenticating a client application access request, generating tokens for validation, collecting and monitoring current load, health and geographical location for a plurality of service provider server devices 14(1)-14(n), although other types and/or numbers of other functions may be performed. Further the E-IdP device 12 may function as a service provider server devices 14(1)-14(n) to perform functions of receiving application access request, send a redirected authentication request and further perform functions of authenticating a request, generating tokens for validation, collecting and monitoring current load, health and geographical location for the plurality of service provider server devices 14(1)-14(n). The E-IdP device 12 includes one or more processors 24, a memory 26, and/or a communication interface 22, which are coupled together by a bus 30 or other communication link, although the E-IdP device 12 can include other types and/or numbers of elements in other configurations.

The processor(s) of the E-IdP device 12 may execute programmed instructions stored in the memory 26 of the E-IdP device 12 for the any number of the functions identified above. The processor(s) of the E-IdP device 12 may include one or more CPUs or general purpose processors with one or more processing cores, for example, although other types of processor(s) can also be used.

The memory 26 of the E-IdP device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 24, can be used for the memory 26.

Figure 3:
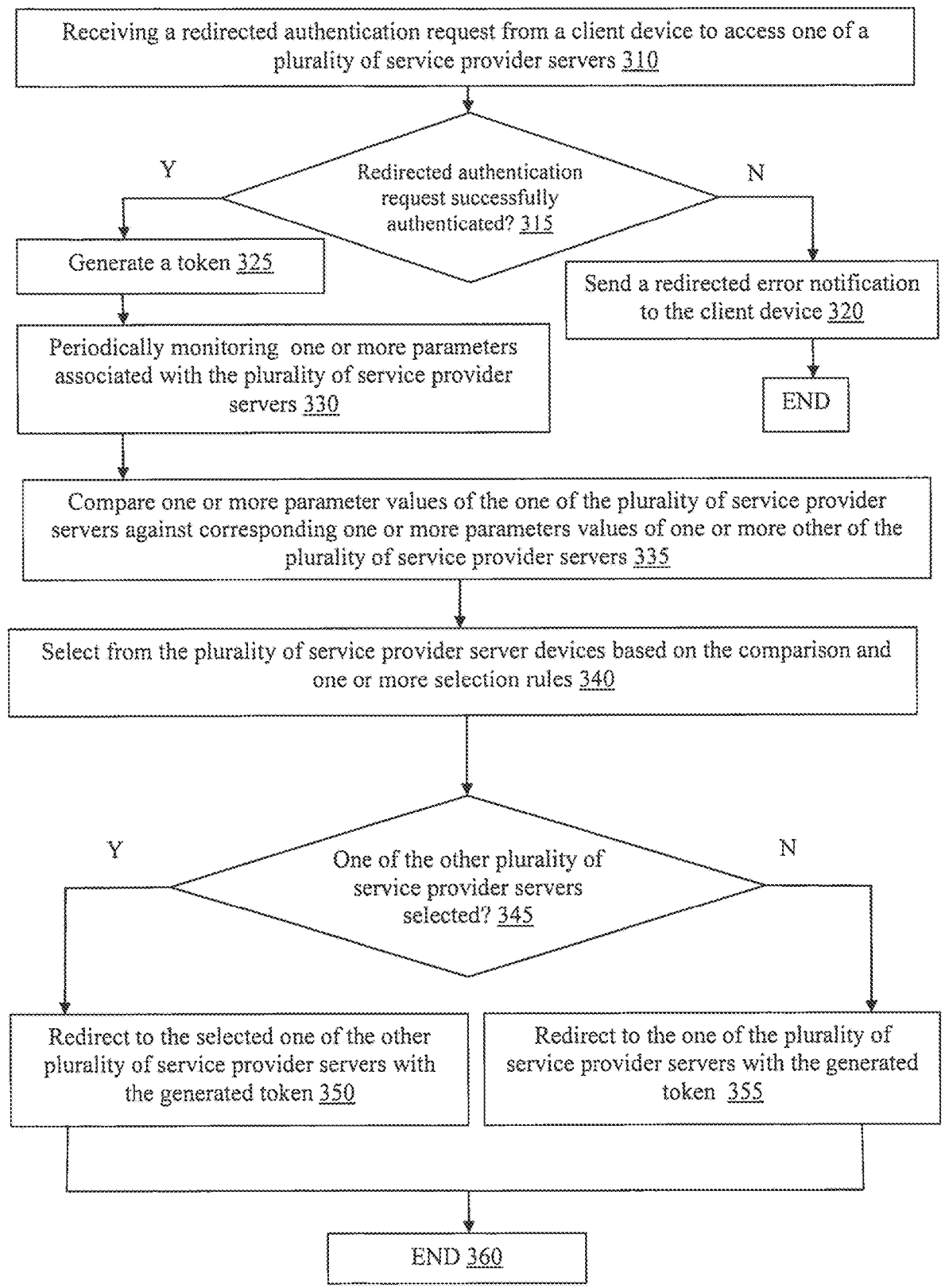
FIG. 3 is a flowchart of an exemplary method for initializing the exemplary E-IdP device of FIG. 1.
Figure 4:
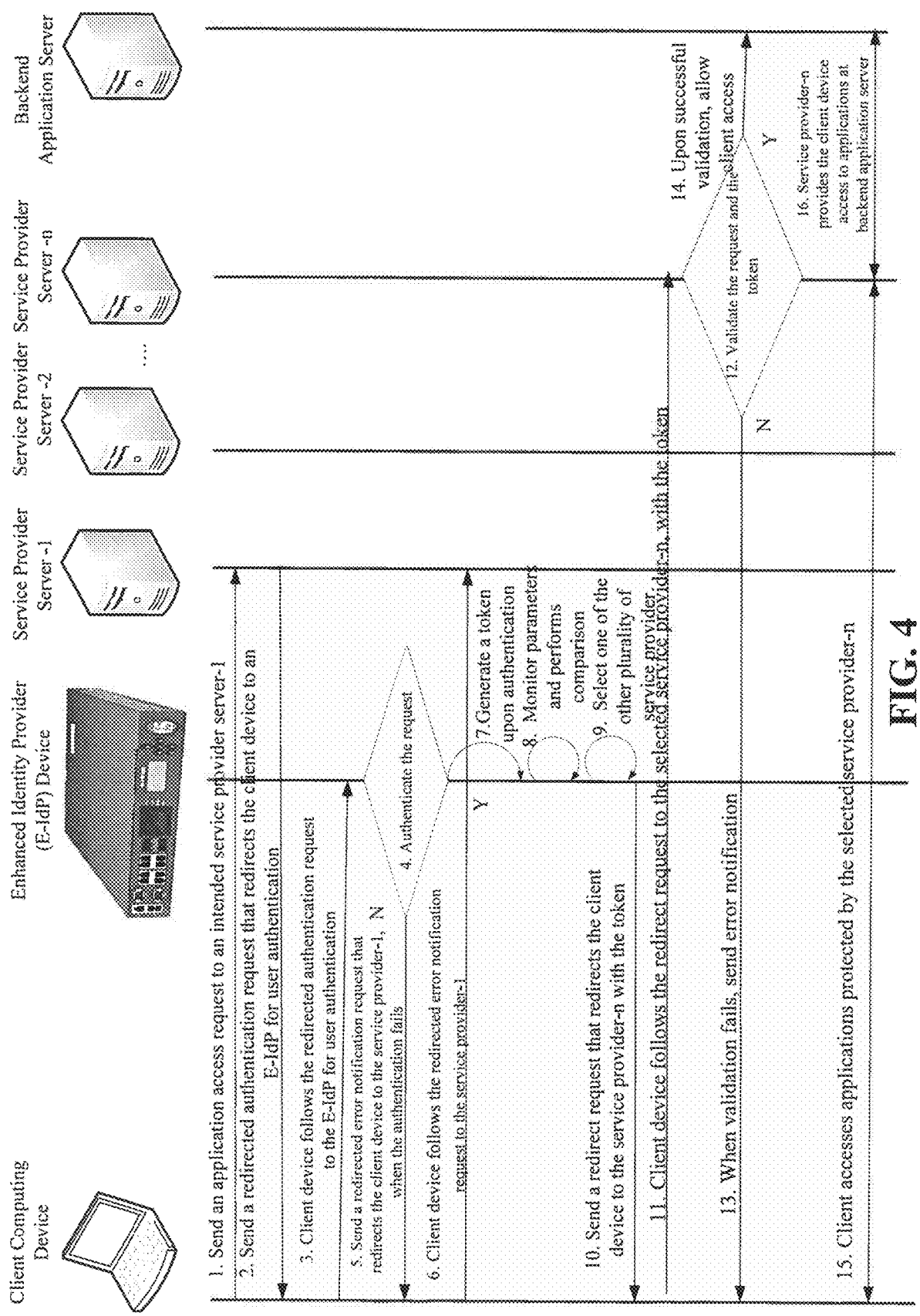
FIG. 4 is a flowchart of an exemplary method for load balancing in a federated identity environment.

Accordingly, the memory 26 of the E-IdP device 12 can store one or more applications that can include computer executable instructions that, when executed by the E-IdP device 12, cause the E-IdP device 12 to perform actions, such as collecting and monitoring the current load, health and geographical location of a plurality of service provider server devices 14(1)-14(n) and load balancing the user traffic across multiple service provider server devices 14(1)-14(n) for improved availability and manageability of the applications, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the E-IdP device 12 itself, may be located in virtual server(s) running in a cloud-based computing environment rather than being tied to one or more specific physical network computing devices. Also, the application(s) may be running in one or more virtual machines (VMs) executing on the E-IdP device 12. Additionally, in one or more embodiments of this technology, virtual machine(s) running on the E-IdP device 12 may be managed or supervised by a hypervisor.

In this particular example, the memory of the E-IdP device 12 includes a memory 26 for processing received authentication requests and a user identity information storage although the memory 26 can include other policies, modules, databases, or applications, for example. The E-IdP device 12 receives an authentication request to access one of a plurality of service provider server devices 14(1)-14(n) and the E-IdP device 12 may act as an authentication module, to authenticate the user requests before accessing applications at one of the backend application server devices 20(1)-20(n) associated with one of the plurality of service provider server devices 14(1)-14(n). The E-IdP device 12 may have access to user's identity information stored within the user identity information storage 28. The E-IdP device 12 collects user identity information from the client devices 16(1)-16(n) and accesses stored user identity information to authenticate the user. Upon authentication the E-IdP device 12 generates a token associated with the request. The E-IdP device 12 also collects and monitors current load parameter, health parameter, and geographical location parameter of the plurality of service provider server devices 14(1)-14(n).

The user identity information storage 28 may store information associated with users identity and is utilized to authenticate the user request. The user identity information includes, for example, user ID, username, password, mobile number, personal preferences, user location information or user preferences.

The communication interface 22 of the E-IdP device 12 operatively couples and communicates between the E-IdP device 12, the service provider server devices 14(1)-14(n), and/or the client devices 16(1)-16(n), which are all coupled together by the communication network(s) 18, although other types and/or numbers of communication networks 18 or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks 18 can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the E-IdP device 12, one or more of the client devices 16(1)-16(n), one or more of the service provider server devices 14(1)-14(n), or one or more backend application server devices 20(1)-20(n) operate as virtual instances on the same physical machine).

While the E-IdP device 12 is illustrated in this example as including a single device, the E-IdP device 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the E-IdP device 12.

Additionally, one or more of the devices that together comprise the E-IdP device 12 in other examples can be standalone devices or integrated with one or more other devices or apparatuses, such as one of the service provider server devices 14(1)-14(n), for example. Moreover, one or more of the devices of the E-IdP device 12 in these examples can be in a same or a different communication network 18 including one or more public, private, or cloud networks, for example.

Each of the service provider server devices 14(1)-14(n) of the network traffic management system 10 in this example includes one or more processors, a memory, and a communication interface, which are coupled together by a bus or other communication link, although other numbers and/or types of network devices could be used. Each of the plurality of service provider server devices 14(1)-14(n) are coupled to corresponding backend application server devices 20(1)-20(n). In yet another example, each of the plurality of service provider server devices 14(1)-14(n) are coupled to one or more backend application server devices 20(1)-20(n). The service provider server devices 14(1)-14(n) in this example process requests received from the client devices 16(1)-16(n) via the communication network(s) 18 according to the HTTP-based application RFC protocol, for example. Various applications may be operating on the service provider server devices 14(1)-14(n) and transmitting data (e.g., files or Web pages) to the client devices via the E-IdP device 12 in response to requests from the client devices 16(1)-16(n). The service provider server devices 14(1)-14(n) may be hardware or software or may represent a system with multiple service provider server devices 14(1)-14(n) in a pool, which may include internal or external networks.

Although the service provider server devices are illustrated as single devices, one or more actions of each of the service provider server devices may be distributed across one or more distinct network computing devices that together comprise one or more of the service provider server devices. Moreover, the service provider server devices are not limited to a particular configuration. Thus, the service provider server devices may contain a plurality of network computing devices that operate using a master/slave approach, whereby one of the network computing devices of the service provider server devices operate to manage and/or otherwise coordinate operations of the other network computing devices. The service provider server devices may operate as a plurality of network computing devices within a cluster architecture, a peer-to peer architecture, virtual machines, or within a cloud architecture, for example.

Each of the backend application server devices of the network traffic management system in this example includes one or more processors, a memory including one or more applications, and a communication interface, which are coupled together by a bus or other communication link, although other numbers and/or types of network devices could be used. The one or more client devices may access the one or more applications associated with the backend application server device. The backend application server device in this example process requests received from the client devices via the communication network(s) 18 according to the HTTP-based application RFC protocol, for example. Various applications may be operating on the backend application server devices and transmitting data (e.g., files or Web pages) to the client devices in response to requests from the client devices. The backend application server device may be hardware or software or may represent a system with multiple backend application servers in a pool, which may include internal or external networks.

Although the backend application server device may be single devices, one or more actions of each of the backend application server devices may be distributed across one or more distinct network computing devices that together comprise one or more of the backend application server devices. In yet another example, each of the backend application server devices can operate within the service provider server device rather than as a stand-alone server communicating with the service provider server device. Moreover, each of the backend application server devices are not limited to a particular configuration. Thus, each of the backend application server devices may contain a plurality of network computing devices that operate using a master/slave approach, whereby one of the network computing devices of the backend application server devices operate to manage and/or otherwise coordinate operations of the other network computing devices. Each of the backend application server devices may operate as a plurality of network computing devices within a cluster architecture, a peer-to peer architecture, virtual machines, or within a cloud architecture, for example. Each of the backend application server devices may also communicate with the client devices, service provider server devices and the E-IdP device 12.

Thus, the technology disclosed herein is not to be construed as being limited to a single environment and other configurations and architectures are also envisaged. For example, the E-IdP device 12 depicted in FIG. 1 can operate within an access policy manager apparatus (APM) rather than as a stand-alone server communicating with the client devices and the backend application servers. In this example the E-IdP device 12 operates within the memory of the access policy manager apparatus. Further in another example, the one or more of the plurality of service provider servers depicted in FIG. 1 can operate within the E-IdP device 12 rather than as a stand-alone server communicating with the client devices and the backend application servers. In this example the plurality of service provider servers operate within the memory of the E-IdP device 12. Further in another example, the E-IdP device 12 and the one or more of the plurality of service provider servers depicted in FIG. 1 both together can operate within the APM rather than as a stand-alone server communicating with the client devices and the backend application servers. Further in another example, the E-IdP device 12 depicted in FIG. 1 can operate as the APM communicating with the service provider server devices 14(1)-14(n) and the client devices 16(1)-16(n).

The client devices 16(1)-16(n) of the network traffic management system 10 in this example include any type of computing device that can receive, render, and facilitate user interaction with a webtop, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and/or types of network devices could be used. In one example, the client devices 16(1)-16(n) may communicate with the backend application server devices 20(1)-20(n). In another example the client devices 16(1)-16(n) may communicate with the E-IdP device 12 directly. Further in another example the client devices 16(1)-16(n) may communicate with each of the service provider server devices 14(1)-14(n) directly.

The client devices 16(1)-16(n) may run interface applications, such as standard Web browsers or standalone client applications, which may provide an interface to make requests for, and receive content stored on, one or more of the service provider server devices 14(1)-14(n) via the communication network(s) 18. The client devices 16(1)-16(n) may further include a display device, such as a display screen or touchscreen, and/or an input device, such as a keyboard for example.

Although the exemplary network traffic management system 10 with the E-IdP device 12, service provider server devices 14(1)-14(n), backend application server devices 20(1)-20(n), client devices 16(1)-16(n), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the E-IdP device 12, client devices 16(1)-16(n), service provider server devices 14(1)-14(n) or backend application server devices 20(1)-20(n), for example, may be configured to operate as virtual instances on the same physical machine. In other words, one or more of the E-IdP device 12, client devices 16(1)-16(n), service provider server devices 14(1)-14(n) or backend application server devices 20(1)-20(n) may operate on the same physical device rather than as separate devices communicating through communication network(s) 18. Additionally, there may be more or fewer E-IdP device 12, client devices 16(1)-16(n), service provider server devices 14(1)-14(n) or backend application server devices 20(1)-20(n) than illustrated in FIG. 1. The client devices could also be implemented as applications on the E-IdP device 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of load balancing in a federated identity environment and devices thereof will now be described with reference to FIGS. 1-4. Referring more specifically to FIG. 3, in this example in a first step 310, the E-IdP device 12 receives from one of the client devices 16(1)-16(n) a redirected authentication request which was redirected by one of the plurality of service provider server devices 14(1)-14(n). In this example, the one of the plurality of service provider server devices 14(1)-14(n) is the service provider server device-1 14(1) and is referred to herein as the intended service provider server 14(1). The enhanced identity provider (E-IdP) device 12 of the network traffic management system 10 receives the redirected authentication request from one of the client devices 16(1)-16(n) to access the intended service provider server device 14(1). After receiving the authentication request from the requesting one of the client devices 16(1)-16(n), the E-IdP device 12 collects identity information from the user of the client devices 16(1)-16(n) to authenticate the user to provide access to the intended service provider server device 14(1). The E-IdP device 12 performs the authentication by associating the collected user identity information with information stored in the user identity information storage 28 of the E-IdP device 12 to authenticate the request. In yet another example, the E-IdP device 12 performs the authentication by validating the collected user identity information with information stored in the user identity information storage 28 of the E-IdP device 12, and upon a successful validation the request is authenticated.

In step 315, the E-IdP device 12 determines whether the request from the requesting one of the client devices 16(1)-16(n) is authenticated. If in step 315, the E-IdP device 12 determines that the request is not authenticated, then the No branch is taken to step 320.

In step 320, the E-IdP device 12 sends a redirected error notification message to the requesting one of the client devices 16(1)-16(n). This redirected error notification message redirects the requesting one of the client devices 16(1)-16(n) with the error message to the intended service provider server device 14(1) which provides a notification that the request is not authenticated and this example of the method may end.

If back in step 315, the E-IdP device 12 determines that the request from the requesting one of the client devices 16(1)-16(n) is authenticated, then the Yes branch is taken to step 325. In step 325, the E-IdP device 12 generates a token used for validation as described in greater detail further below. After generating the token the method proceeds to step 330.

In step 330, the E-IdP device 12 periodically monitors one or more parameters of the plurality of service provider servers 14(1)-14(n). The E-IdP device 12 periodically monitors one or more network parameters for the plurality of service provider server devices 14(1)-14(n) which are utilized to perform the comparison. By way of example, the one or more network parameters may include, a current load parameter, a server health parameter, and/or geographic location parameter associated with the plurality of service provider server devices 14(1)-14(n), although other types and/or numbers of parameters may be used. The E-IdP device 12 periodically monitors one or more network parameter and collects one or more network parameter data values associated with the one or more network parameters. By way of example, the one or more network parameter data values may include, a current load value, a server health value, and/or geographic location value associated with the plurality of service provider server devices 14(1)-14(n), although other types and/or numbers of parameter data values may be used. The collected one or more network parameters values for the plurality of service provider server devices 14(1)-14(n) are utilized in step 335 below.

In step 335, the E-IdP device 12 compares the collected one or more network parameter values associated with the intended service provider server device 14(1) against corresponding other one or more network parameter values associated with the other of the plurality of service provider server devices 14(2)-14(n). By way of example, the one or more network parameter data values may include, a current load value, a server health value, and/or geographic location value associated with the plurality of service provider server devices 14(1)-14(n), although other types and/or numbers of parameter values may be used. By way of example, the E-IdP device 12 compares the current load value associated with the service provider server device-1 14(1) with each of the corresponding current load values associated with the service provider server devices 14(2)-14(n). By way of example, the E-IdP device 12 compares the CPU utilization value associated with the service provider server device-1 14(1) with each of the corresponding CPU utilization values associated with the service provider server devices 14(2)-14(n). In another example, the E-IdP device 12 compares the server health value associated with the service provider server device-1 14(1) with corresponding each of the server health value associated with the service provider server devices 14(2)-14(n). In yet another example, the E-IdP device 12 compares the geographic location value associated with the service provider server device-1 14(1) with each of the corresponding geographic location value associated with the service provider server devices 14(2)-14(n). The detecting of the hardware deficiencies or failures in the service provider server devices 14(1)-14(n) is performed to identify potential issues in the service provider server devices 14(1)-14(n).

Further, the E-IdP device 12 performs the comparing, for example, by comparing the current load parameter value of the intended service provider server device 14(1) with the current load parameter value of the other service provider server devices 14(2)-14(n). The current load parameter value of the plurality of service provider server devices 14(1)-14(n) may be the current load capacity of the server determined based on the number of processes waiting in a queue to access a processor of the associated service provider server devices 14(1)-14(n) for a specific time period. The smaller the current load means more resources available to process the requests and hence better performance state of the service provider server devices 14(1)-14(n). Based on the comparison in step 335 the capacity of current load for each of the plurality of service provider server devices 14(1)-14(n) is determined. By way of example, the current load parameter value for the intended service provider server device 14(1) may be determined at 60% of its capacity and further the current load parameter value associated with the other service provider server devices 14(2)-14(n) are all determined to be less than 60% of their capacity. In another example, the current load parameter value for the intended service provider server device 14(1) may be determined at 60% of its capacity and further the current load parameter value associated with the other service provider server devices 14(2)-14(n) are all determined to be more than 60% of their capacity. Further, by way of another example, the comparison may also determine the current load parameter value associated with the intended service provider server device 14(1) is the same as that of the other service provider server device 14(2)-14(n).

The health parameter associated with service provider server devices 14(1)-14(n) for example helps in determining the performance of the service provider server devices 14(1)-14(n). The health parameters include server response time of the service provider server devices 14(1)-14(n), hardware failures or deficiencies associated with the service provider server devices 14(1)-14(n), CPU utilization associated with the service provider server devices 14(1)-14(n), server heartbeats associated with the service provider server devices 14(1)-14(n). Although, any other parameters associated with determining health of the service provider server devices may also be included. The monitoring of the server response times is performed to determine potential latency issues for the service provider server devices 14(1)-14(n). By way of example, the comparison may be determine that the server response time of the intended service provider server device 14(1) is 50 ms and the server response time associated with each of the other service provider server devices 14(2)-14(n) is less than 50 ms. In another example, the comparison may be determine that the server response time of the intended service provider server device 14(1) is 50 ms and the server response time associated with each of the other service provider server devices 14(2)-14(n) is more than 50 ms. Further, by way of another example, the comparison may also determine the server response time parameter value associated with the intended service provider server device 14(1) is the same as that of the other service provider server device 14(2)-14(n).

The monitoring of the CPU utilization of a server is performed to determine memory utilization of the server, high CPU utilization may cause alerts of performance issues with the service provider server devices 14(1)-14(n). By way of example, the comparison may be determine that the CPU utilization of the intended service provider server device 14(1) is 65% of its usage capacity and the CPU utilization associated with each of the other service provider server devices 14(2)-14(n) is less than 65%. In another example, the comparison may be determine that the CPU utilization of the intended service provider server device 14(1) is 65% of its usage capacity and the CPU utilization associated with each of the other service provider server devices 14(2)-14(n) is more than 65%. Further, by way of another example, the comparison may also determine the CPU utilization parameter value associated with the intended service provider server device 14(1) is the same as that of the other service provider server device 14(2)-14(n).

The heartbeat of the service provider server devices 14(1)-14(n) may be determined by sending a network ping command or a heartbeat message to the service provider server devices 14(I)-14(n), and a response to the ping command provides information of the service provider server devices 14(1)-14(n) being alive and accepting communications. By way of example, the comparison may be determine that the response time to the ping for determining the heartbeat of the intended service provider server device 14(1) is 20 ms and the response time to the ping for determining the heartbeat associated with each of the other service provider server devices 14(2)-14(n) is less than 20 ms. In another example, the comparison may be determine that the response time to the ping for determining the heartbeat of the intended service provider server device 14(1) is 20 ms and the response time to the heartbeat message for determining the heartbeat associated with each of the other service provider server devices 14(2)-14(n) is more than 20 ms. Further, by way of another example, the comparison may also determine the response time parameter value associated with the intended service provider server device 14(1) is the same as that of the other service provider server device 14(2)-14(n).

The geographic location parameter of the service provider server devices 14(1)-14(n) may be determined as a distance between geographic location of the service provider server devices 14(1)-14(n) potentially servicing the request and the requesting one of the client devices 16(1)-16(n) requesting to access the application. Lesser the distance lesser would be the latency, number of hops, and lesser would be a potential of hardware failure as the number of hardware components are reduced with lesser distance. By way of example, the comparison may be determine that the geographic distance between the intended service provider server device 14(1) and the requesting one of the client devices 16(1)-16(n) is less than and the distance associated with each of the other service provider server devices 14(2)-14(n). In another example, the comparison may be determine that the geographic distance between the intended service provider server device 14(1) and the requesting one of the client devices 16(1)-16(n) is more than and the distance associated with each of the other service provider server devices 14(2)-14(n). Further, by way of another example, the comparison may also determine the geographic distance associated with the intended service provider server device 14(1) is the same as that of the other service provider server device 14(2)-14(n).

In another embodiment, if in the comparison step 335 of FIG. 3 the one or more of the other service provider server devices 14(1)-14(n) has a current load parameter equal to the current load parameter of the intended service provider server devices 14(1)-14(n), then the intended service provider server is selected. In another embodiment, when the one or more of the other service provider server devices 14(1)-14(n) has a current load parameter equal to the current load parameter of the intended service provider server, then the one or more of the other service provider servers devices 14(1)-14(n) may be selected over the intended service provider server. In another embodiment, more than one other service provider server devices 14(1)-14(n) may be selected.

In yet another embodiment, the comparison may be performed by comparing more than one parameters of the service provider server devices 14(1)-14(n) based on priorities assigned to the parameters. By way of example, the comparison may be performed by comparing the current load parameter, the health parameter and the geographic location parameter for the intended service provider server and the other service providers based on priorities assigned to each of the parameters. The current load parameter may be assigned the highest priority rank of 1 followed by the health parameter having a lower priority rank of 2 and the geographic location parameter having the least priority rank of 3. Although other types and/or numbers of other parameter comparison may be performed with any number of priorities.

In step 340, the E-IdP device 12 selecting from the plurality of service provider server devices 14(1)-14(n) based on the comparison and one or more selection rules stored in the memory 26. The stored selection rules, may include, selecting the service provider server device with the least current load parameter value, selecting the service provider server device with the least response time, selecting the service provider service device with the least CPU utilization, selecting the service provider service device with the least response time for heartbeat messages, selecting the service provider service device with least geographic distance between the client devices 16(1)-16(n) and the service provider server devices 14(1)-14(n). Further, the selection rules may include, when the one or more network parameter values between the intended service provider server device 14(1) and the other service provider server devices 14(2)-14(n) are equal, then selecting the intended service provider server device 14(1). Based on the selection rules, the E-IdP device 12 selects of a service provider server device that would process the request from the service provider server devices 14(1)-14(n).

Specifically, the selection rules, may include, by way of example, selecting one of the other service provider server devices 14(2)-14(n) when the comparison indicates that the current load parameter value for the intended service provider server device 14(1) may be determined at 60% of its capacity and further the current load parameter value associated with the other service provider server devices 14(2)-14(n) are all determined to be less than 60% of their capacity. In this example, from the other service provider server devices 14(2)-14(1) the E-IdP device 12 selects the service provider server device with the least current load parameters. By way of example, E-IdP device 12 selects the service provider server device 14(2) as it is determined in step 335 that the service provider server device 14(2) has a current load parameters value of 40% and is the least in comparison to all of the other service provider server devices 14(1), 14(3)-14(n). By way of example, another selecting rules may include, selecting the intended service provider server device 14(1) when the comparison of step 335 determines that the current load parameter value for the intended service provider server device 14(1) may be determined at 60% of its capacity and further the current load parameter value associated with the other service provider server devices 14(2)-14(n) are all determined to be more than 60% of their capacity. In this example, as the intended service provider server device 14(1) has the least current load parameter value it is selected.

In another example, the selection rules, may include, by way of example, selecting one of the other service provider server devices 14(2)-14(n) when the comparison of step 335 determines that the response time of the intended service provider server device 14(1) is 50 ms and the response time associated with each of the other service provider server devices 14(2)-14(n) is less than 50 ms. In this example, from the other service provider server devices 14(2)-14(1) the E-IdP device 12 selects the service provider server device with the least response time value. By way of example, E-IdP device 12 selects the service provider server device 14(2) as it is determined in step 335 that the service provider server device 14(2) has a response time value of 30 ms and is the least response time in comparison to all of the other service provider server devices 14(1), 14(3)-14(n). By way of example, another selecting rules may include, selecting the intended service provider server device 14(1) when the response time of the intended service provider server device 14(1) is 50 ms and the response time associated with each of the other service provider server devices 14(2)-14(n) is more than 50 ms. In this example, from the other service provider server devices 14(1)-14(n) the E-IdP device 12 selects the service provider server device with the least response time value. By way of example, E-IdP device 12 selects the service provider server device 14(1) as it is determined in step 335 that the service provider server device 14(1) has a response time value of 50 ms, which is the least response time in comparison to all of the other service provider server devices 14(2)-14(*n*).

In another example, the selection rules, may include, by way of example, selecting one of the other service provider server devices 14(2)-14(*n*) when the comparison of step 335 determines that the CPU utilization of the intended service provider server device 14(1) is 65% and the CPU utilization associated with each of the other service provider server devices 14(2)-14(*n*) is less than 65%. In this example, from the other service provider server devices 14(2)-14(1) the E-IdP device 12 selects the service provider server device with the least CPU utilization value. By way of example, E-IdP device 12 selects the service provider server device 14(2) as it is determined in step 335 that the service provider server device 14(2) has a CPU utilization value of 45% and is the least CPU utilization in comparison to all of the other service provider server devices 14(1), 14(3)-14(*n*). By way of example, another selecting rules may include, selecting the intended service provider server device 14(1) when the CPU utilization of the intended service provider server device 14(1) is 65% and the CPU utilization associated with each of the other service provider server devices 14(2)-14(*n*) is more than 65%. In this example, from the other service provider server devices 14(1)-14(*n*) the E-IdP device 12 selects the service provider server device with the least CPU utilization value. By way of example, E-IdP device 12 selects the service provider server device 14(1) as it is determined in step 335 that the service provider server device 14(1) has a CPU utilization value of 65%, which is the least CPU utilization in comparison to all of the other service provider server devices 14(2)-14(*n*).

In another example, the selection rules, may include, by way of example, selecting one of the other service provider server devices 14(2)-14(*n*) when the comparison of step 335 determines that the geographic distance between the intended service provider server device 14(1) and the requesting one of the client devices 16(1)-16(*n*) is more than and the geographic distance between each of the other service provider server devices 14(2)-14(*n*) and the requesting one of the client devices 16(1)-16(*n*). In this example, from the other service provider server devices 14(2)-14(1) the E-IdP device 12 selects the service provider server device with the least geographic distance between each of the other service provider server devices 14(2)-14(*n*) and the requesting one of the client devices 16(1)-16(*n*). By way of example, E-IdP device 12 selects the service provider server device 14(2) as it is determined in step 335 that the service provider server device 14(2) has the least geographic distance between each of the other service provider server devices 14(2)-14(*n*) and the requesting one of the client devices 16(1)-16(*n*) in comparison to all of the other service provider server devices 14(1), 14(3)-14(*n*). By way of example, another selecting rules may include, selecting the intended service provider server device 14(1) geographic distance between the intended service provider server device 14(1) and the requesting one of the client devices 16(1)-16 (*n*) is less than and the geographic distance between each of the other service provider server devices 14(2)-14(*n*) and the requesting one of the client devices 16(1)-16(*n*). In this example, from the other service provider server devices 14(1)-14(*n*) the E-IdP device 12 selects the service provider server device with the least geographic distance between each of the other service provider server devices 14(1)-14(*n*) and the requesting one of the client devices 16(1)-16(*n*). By way of example, E-IdP device 12 selects the service provider server device 14(1) as it is determined in step 335 that the service provider server device 14(1) has the least geographic distance to the requesting one of the client devices 16(1)- 16(*n*) in comparison to all of the other service provider server devices 14(2)-14(*n*).

In step 345, the E-IdP device 12 determines if in step 340 one of the other plurality of service provider server devices 14(2)-14(*n*) are selected in step 340. By way of example, when the E-IdP device 12 determines that in step 340 one of the other plurality of service provider server devices 14(2)-14(*n*) is selected over the intended service provider server device 14(1), then the method takes the Yes branch and proceeds to step 350. By way of example, E-IdP device 12 selects the service provider server device 14(2) as it is determined in step 335 that the service provider server device 14(2) has a current load parameters value of 40% which is the least current load parameter value in comparison to all of the other service provider server devices 14(1), 14(3)-14(*n*) and the method proceeds to step 350.

In step 350, the E-IdP device 12 redirects the requesting one of the client devices 16(1)-16(*n*) to the selected one of the one or more other of the plurality of service provider server devices 14(2)-14(*n*) with the generated token for accessing one or more applications associated with the selected one of one or more other of the plurality of service provider server devices 14(2)-14(*n*). The E-IdP device 12 may send a redirect request to the requesting one of the client devices 16(1)-16(*n*), which redirects the requesting one of the client devices 16(1)-16(*n*) to the selected one of the other plurality of service provider server devices 14(2)- 14(*n*) with the generated token. As part of a registration process the E-IdP device 12 registers URI for each of the other plurality of service provider server devices 14(2)-14(*n*) in the memory and based on a service provider server selected, the requesting one of the client devices 16(1)-16(*n*) are redirected back to the registered redirect URI associated with the selected service provider server device. The redirect request redirects the requesting one of the client devices 16(1)-16(*n*) to the selected one of the other plurality of service provider server devices 14(2)-14(*n*) with the token for accessing one or more applications associated with the selected one of the plurality of service provider server devices 14(2)-14(*n*) and the method proceeds to step 360 and ends.

If back in step 345 the E-IdP device 12 determines, that the determined selection in step 340 is not selecting one of the other plurality of service provider server devices 14(2)- 14(*n*) then the method takes the No branch and proceeds to step 355. By way of example, when the E-IdP device 12 determines that in step 340 intended service provider server devices 14(1) is selected over the other plurality of service provider server devices 14(2)-14(*n*), then the method takes the No branch and proceeds to step 355. By way of example, E-IdP device 12 selects the service provider server device 14(1) as it is determined in step 335 that the service provider server device 14(1) has a current load parameters value of 40% which is the least current load parameter value in comparison to all of the other service provider server devices 14(2)-14(*n*) and the method proceeds to step 355.

In step 355, the E-IdP device 12 redirects the requesting one of the client devices 16(1)-16(*n*) to the selected intended service provider server device 14(1) with the generated token for accessing one or more applications associated with the selected intended service provider server device 14(1). The E-IdP device 12 may send a redirect request to the requesting one of the client devices 16(1)-16(*n*), which redirects the requesting one of the client devices 16(1)-16(*n*) to the selected intended service provider server device 14(1)

with the generated token. As part of a registration process the E-IdP device 12 registers URI for each of the plurality of service provider server devices 14(1)-14(n) in the memory and based on a service provider server selected, the requesting one of the client devices 16(1)-16(n) are redirected back to the registered redirect URI associated with the selected service provider server devices. The redirect request redirects the requesting one of the client devices 16(1)-16(n) to the selected intended service provider server device 14(1) with the token for accessing one or more applications associated with the selected intended service provider server device 14(1) and the method proceeds to step 360 and ends.

An exemplary method of load balancing in a federated identity environment and devices thereof will now be described with reference to FIGS. 1-4. Specifically, referring to FIG. 4 an example of a method for load balancing in a federated identity environment and devices. Flow of the FIG. 4 includes one or more client devices 16(1)-16(n), E-IdP device 12, one or more service provider server devices 14(1)-14(n) and one or more backend application server devices 20(1)-20(n).

In step 1, the client device sends an application access request to an intended service provider server-1 to access application associated with the service provider server-1. As the request is sent to the service provider server-1, the service provider server-1 is intended to service the request by providing the client access to one or more backend application servers associated with the service provider server-1. The service provider server-1 is also referred to in the examples herein as the intended service provider server.

In step 2, upon receiving the application access request, the service provider server-1 sends a redirected authentication request that redirects the client device to an E-IdP device 12 for user authentication. The redirected authentication request redirects the client device to the E-IdP device 12 for user authentication.

In step 3, the client device follows the redirected authentication request to the E-IdP device 12 for user authentication. The redirected authentication request redirects the client device to the E-IdP device 12 for authentication. The E-IdP device 12 receives the redirected authentication request from the client device.

In step 4 the received redirected authentication request from the client device which was redirected by the service provider server-1 is authenticated. After receiving the authentication request, the E-IdP device 12 collects identity information from the user of the client device to authenticate the user of the client device and a determination is made when the request is authenticated. The E-IdP device 12 performs authentication of the request by associating the stored user identity information with the collected user identification information to authenticate the request. After the E-IdP device 12 performs authentication of the request, a token is generated which is utilized later for validation of the request.

In step 5, the E-IdP device 12 sends a redirected error notification request, when it is determined that the authentication request fails authentication and that the request is not authenticated in step 4. The E-IdP device 12 sends a redirected error notification request that redirects the client device to the service provider server-1.

In step 6, the client device follows the redirected error notification request to the service provider-1 notifying the service provider server-1 that the request has failed authentication.

In step 7 the E-IdP device 12 generates a token, when it is determined that the request is authenticated back in step 4. The E-IdP device 12 generates a token in response to the request being authenticated, and this token is utilized for validation. The utilization of token for validation is explained below.

In step 8, the E-IdP device 12 periodically monitors one or more parameters of the plurality of service provider server device 1-n and performs comparison between the service provider server device-1 and the other plurality of service provider server devices 2-n. The E-IdP device 12 periodically monitors one or more network parameters for the plurality of service provider server device 1-n which are utilized to perform the comparison. By way of example, the one or more network parameters may include, a current load parameter, a server health parameter, and/or geographic location parameter associated with the plurality of service provider server devices 1-n, although other types and/or numbers of parameters may be used. The E-IdP device 12 periodically monitors one or more network parameter and collects one or more network parameter data values associated with the one or more network parameters. By way of example, the one or more network parameter data values may include, a current load value, a server health value, and/or geographic location value associated with the plurality of service provider server devices 1-n, although other types and/or numbers of parameter data values may be used. The collected one or more network parameters values for the plurality of service provider server devices 1-n are utilized for comparison.

The E-IdP device 12 compares the collected one or more network parameter values associated with the intended service provider server device 1 against corresponding other one or more network parameter values associated with the other of the plurality of service provider server devices 2-n. By way of example, the one or more network parameter data values may include, a current load value, a server health value, and/or geographic location value associated with the plurality of service provider server devices 1-n, although other types and/or numbers of parameter values may be used. By way of example, the E-IdP device 12 compares the current load value associated with the service provider server device-1 with each of the corresponding current load values associated with the service provider server devices 2-n. By way of example, the E-IdP device 12 compares the CPU utilization value associated with the service provider server device-1 with each of the corresponding CPU utilization values associated with the service provider server devices 2-n. In another example, the E-IdP device 12 compares the server health value associated with the service provider server device-1 with corresponding each of the server health value associated with the service provider server devices 2-n. In yet another example, the E-IdP device 12 compares the geographic location value associated with the service provider server device-1 with each of the corresponding geographic location value associated with the service provider server devices 2-n. The detecting of the hardware deficiencies or failures in the service provider server devices 1-n is performed to identify potential issues in the service provider server devices 1-n.

Further, the E-IdP device 12 performs the comparing, for example, by comparing the current load parameter value of the intended service provider server device 1 with the current load parameter value of the other service provider server devices 2-n. The current load parameter value of the plurality of service provider server devices 1-n may be the current load capacity of the server determined based on the number of processes waiting in a queue to access a processor of the associated service provider server devices 1-n for a specific time period. The smaller the current load means more resources available to process the requests and hence better performance state of the service provider server devices 1-n. Based on the comparison the capacity of current load for each of the plurality of service provider server devices 1-n is determined. By way of example, the current load parameter value for the intended service provider server device 1 may be determined at 60% of its capacity and further the current load parameter value associated with the other service provider server devices 2-n are all determined to be less than 60% of their capacity. In another example, the current load parameter value for the intended service provider server device 1 may be determined at 60% of its capacity and further the current load parameter value associated with the other service provider server devices 2-n are all determined to be more than 60% of their capacity. Further, by way of another example, the comparison may also determine the current load parameter value associated with the intended service provider server device 1 is the same as that of the other service provider server device 2-n.

The health parameter associated with service provider server devices 1-n for example helps in determining the performance of the service provider server devices 1-n. The health parameters include server response time of the service provider server devices 1-n, hardware failures or deficiencies associated with the service provider server devices 1-n, CPU utilization associated with the service provider server devices 1-n, server heartbeats associated with the service provider server devices 1-n. Although, any other parameters associated with determining health of the service provider server devices may also be included. The monitoring of the server response times is performed to determine potential latency issues for the service provider server devices 1-n. By way of example, the comparison may be determine that the server response time of the intended service provider server device 1 is 50 ms and the server response time associated with each of the other service provider server devices 2-n is less than 50 ms. In another example, the comparison may be determine that the server response time of the intended service provider server device 1 is 50 ms and the server response time associated with each of the other service provider server devices 2-n is more than 50 ms. Further, by way of another example, the comparison may also determine the server response time parameter value associated with the intended service provider server device 1 is the same as that of the other service provider server device 2-n.

The monitoring of the CPU utilization of a server is performed to determine memory utilization of the server, high CPU utilization may cause alerts of performance issues with the service provider server devices 1-n. By way of example, the comparison may be determine that the CPU utilization of the intended service provider server device 1 is 65% of its usage capacity and the CPU utilization associated with each of the other service provider server devices 2-n is less than 65%. In another example, the comparison may be determine that the CPU utilization of the intended service provider server device 1 is 65% of its usage capacity and the CPU utilization associated with each of the other service provider server devices 2-n is more than 65%. Further, by way of another example, the comparison may also determine the CPU utilization parameter value associated with the intended service provider server device 1 is the same as that of the other service provider server device 2-n.

The heartbeat of the service provider server devices 1-n may be determined by sending a network ping command or a heartbeat message to the service provider server devices 1-n, and a response to the ping command provides information of the service provider server devices 1-n being alive and accepting communications. By way of example, the comparison may be determine that the response time to the ping for determining the heartbeat of the intended service provider server device 1 is 20 ms and the response time to the ping for determining the heartbeat associated with each of the other service provider server devices 2-n is less than 20 ms. In another example, the comparison may be determine that the response time to the ping for determining the heartbeat of the intended service provider server device 1 is 20 ms and the response time to the heartbeat message for determining the heartbeat associated with each of the other service provider server devices 2-n is more than 20 ms. Further, by way of another example, the comparison may also determine the response time parameter value associated with the intended service provider server device 1 is the same as that of the other service provider server device 2-n.

The geographic location parameter of the service provider server devices 1-n may be determined as a distance between geographic location of the service provider server devices 1-n potentially servicing the request and the requesting one of the client devices 16(1)-16(n) requesting to access the application. Lesser the distance lesser would be the latency, number of hops, and lesser would be a potential of hardware failure as the number of hardware components are reduced with lesser distance. By way of example, the comparison may be determine that the geographic distance between the intended service provider server device 1 and the requesting one of the client devices 16(1)-16(n) is less than and the distance associated with each of the other service provider server devices 2-n. In another example, the comparison may be determine that the geographic distance between the intended service provider server device 1 and the requesting one of the client devices 16(1)-16(n) is more than and the distance associated with each of the other service provider server devices 2-n. Further, by way of another example, the comparison may also determine the geographic distance associated with the intended service provider server device 1 is the same as that of the other service provider server device 2-n.

In another embodiment, if in the comparison step 8 the one or more of the other service provider server devices 1-n has a current load parameter equal to the current load parameter of the intended service provider server devices 1-n, then the intended service provider server is selected. In another embodiment, when the one or more of the other service provider server devices 1-n has a current load parameter equal to the current load parameter of the intended service provider server, then the one or more of the other service provider servers devices 1-n may be selected over the intended service provider server. In another embodiment, more than one other service provider server devices 1-n may be selected.

In yet another embodiment, the comparison may be performed by comparing more than one parameters of the service provider server devices 1-n based on priorities assigned to the parameters. By way of example, the comparison may be performed by comparing the current load parameter, the health parameter and the geographic location parameter for the intended service provider server and the other service providers based on priorities assigned to each of the parameters. The current load parameter may be assigned the highest priority rank of 1 followed by the health parameter having a lower priority rank of 2 and the geographic location parameter having the least priority rank of 3. Although other types and/or numbers of other parameter comparison may be performed with any number of priorities.

In step 9, the E-IdP device 12 selecting one of the other plurality of service provider server devices 2-n based on the comparison of step 8 and one or more selection rules stored in the memory 26. The stored selection rules, may include, selecting the service provider server device with the least current load parameter value, selecting the service provider server device with the least response time, selecting the service provider service device with the least CPU utilization, selecting the service provider service device with the least response time for heartbeat messages, selecting the service provider service device with least geographic distance between the client devices 16(1)-16(n) and the service provider server devices 1-n. Further, the selection rules may include, when the one or more network parameter values between the intended service provider server device 1 and the other service provider server devices 2-n are equal, then selecting the intended service provider server device 1. Based on the selection rules, the E-IdP device 12 selects of a service provider server device that would process the request from the service provider server devices 1-n.

Specifically, the selection rules, may include, by way of example, selecting one of the other service provider server devices 2-n when the comparison indicates that the current load parameter value for the intended service provider server device 1 may be determined at 60% of its capacity and further the current load parameter value associated with the other service provider server devices 2-n are all determined to be less than 60% of their capacity. In this example, from the other service provider server devices 2-n the E-IdP device 12 selects the service provider server device with the least current load parameters. By way of example, E-IdP device 12 selects the service provider server device 2 as it is determined in step 8 that the service provider server device 2 has a current load parameters value of 40% and is the least in comparison to all of the other service provider server devices 1, 3-n. By way of example, another selecting rules may include, selecting the intended service provider server device 1 when the comparison of step 8 determines that the current load parameter value for the intended service provider server device 1 may be determined at 60% of its capacity and further the current load parameter value associated with the other service provider server devices 2-n are all determined to be more than 60% of their capacity. In this example, as the intended service provider server device 1 has the least current load parameter value it is selected.

In another example, the selection rules, may include, by way of example, selecting one of the other service provider server devices 2-n when the comparison of step 8 determines that the response time of the intended service provider server device 1 is 50 ms and the response time associated with each of the other service provider server devices 2-n is less than 50 ms. In this example, from the other service provider server devices 2-n the E-IdP device 12 selects the service provider server device with the least response time value. By way of example, E-IdP device 12 selects the service provider server device 2 as it is determined in step 8 that the service provider server device 2 has a response time value of 30 ms and is the least response time in comparison to all of the other service provider server devices 1, 3-n. By way of example, another selecting rules may include, selecting the intended service provider server device 1 when the response time of the intended service provider server device 1 is 50 ms and the response time associated with each of the other service provider server devices 2-n is more than 50 ms. In this example, from the other service provider server devices 1-n the E-IdP device 12 selects the service provider server device with the least response time value. By way of example, E-IdP device 12 selects the service provider server device 1 as it is determined in step 8 that the service provider server device 1 has a response time value of 50 ms, which is the least response time in comparison to all of the other service provider server devices 2-n.

In another example, the selection rules, may include, by way of example, selecting one of the other service provider server devices 2-n when the comparison of step 8 determines that the CPU utilization of the intended service provider server device 1 is 65% and the CPU utilization associated with each of the other service provider server devices 2-n is less than 65%. In this example, from the other service provider server devices 2-n the E-IdP device 12 selects the service provider server device with the least CPU utilization value. By way of example, E-IdP device 12 selects the service provider server device 2 as it is determined in step 8 that the service provider server device 2 has a CPU utilization value of 45% and is the least CPU utilization in comparison to all of the other service provider server devices 1, 3-n. By way of example, another selecting rules may include, selecting the intended service provider server device 1 when the CPU utilization of the intended service provider server device 1 is 65% and the CPU utilization associated with each of the other service provider server devices 2-n is more than 65%. In this example, from the other service provider server devices 1-n the E-IdP device 12 selects the service provider server device with the least CPU utilization value. By way of example, E-IdP device 12 selects the service provider server device 1 as it is determined in step 8 that the service provider server device 1 has a CPU utilization value of 65%, which is the least CPU utilization in comparison to all of the other service provider server devices 2-n.

In another example, the selection rules, may include, by way of example, selecting one of the other service provider server devices 2-n when the comparison of step 8 determines that the geographic distance between the intended service provider server device 1 and the requesting one of the client devices 16(1)-16(n) is more than and the geographic distance between each of the other service provider server devices 2-n and the requesting one of the client devices 16(1)-16(n). In this example, from the other service provider server devices 2-n the E-IdP device 12 selects the service provider server device with the least geographic distance between each of the other service provider server devices 2-n and the requesting one of the client devices 16(1)-16(n). By way of example, E-IdP device 12 selects the service provider server device 2 as it is determined in step 8 that the service provider server device 2 has the least geographic distance between each of the other service provider server devices 2-n and the requesting one of the client devices 16(1)-16(n) in comparison to all of the other service provider server devices 1, 3-n. By way of example, another selecting rules may include, selecting the intended service provider server device 1 geographic distance between the intended service provider server device 1 and the requesting one of the client devices 16(1)-16(n) is less than and the geographic distance between each of the other service provider server devices 2-n and the requesting one of the client devices 16(1)-16(n). In this example, from the other service provider server devices 1-n the E-IdP device 12 selects the service provider server device with the least geographic distance between each of the other service provider server devices 1-n and the requesting one of the client devices 16(1)-16(n). By way of example, E-IdP device 12 selects the service provider server device 1 as it is determined in step 8 that the service provider server device 1 has the least geographic distance to the requesting one of the client devices 16(1)-16(n) in comparison to all of the other service provider server devices 2-n.

In step 10, the E-IdP device 12 redirects the requesting one of the client devices 16(1)-16(n) to the selected one of the other plurality of service provider server devices 2-n with the generated token for accessing one or more applications associated with the selected one of one or more other of the plurality of service provider server devices 2-n. The E-IdP device 12 may send a redirect request to the requesting one of the client devices 16(1)-16(n), which redirects the requesting one of the client devices 16(1)-16(n) to the selected one of the other plurality of service provider server devices 2-n with the generated token. As part of a registration process the E-IdP device 12 registers URI for each of the other plurality of service provider server devices 2-n in the memory and based on a service provider server selected, the requesting one of the client devices 16(1)-16(n) are redirected back to the registered redirect URI associated with the selected service provider server device. The redirect request redirects the requesting one of the client devices 16(1)-16(n) to the selected one of the other plurality of service provider server devices 2-n with the token for accessing one or more applications associated with the selected one of the plurality of service provider server devices 2-n.

In step 11, the client device follows the redirect request from the E-IdP device 12 to the selected service provider server-n with the token generated in step 7.

In step 12, the selected service provider server-n performs the validation of the token. The service provider server-n performs a validation of the token to determine if the token is valid.

In step 13, the service provider server-n sends an error notification to the client device, when back in step 12 the validation fails and it is determined that the token is not valid. The service provider server-n sends an error notification to the client device, notifying the client device that the validation has failed.

In step 14 the service provider server-n allows the client device access to one or more applications, upon successful validation of the token back in step 12. The service provider server-n allows the client device access to one or more applications that are protected by the backend application server associated the service provider server-n.

In step 15 the client accesses the applications protected by the selected service provider-n, and in step 16 the selected service provider-n provides the client device access to applications at the backend server application associated with the service provider server-n. As a result based on the comparison the selected service provider server-n services the client device, this provides the advantage of dynamically servicing requests based on the current network status of the parameters of the service provider servers. This optimized process of processing requests and content delivery to client devices provides an optimal end-user experience.

In another example, back in step 9 of FIG. 4, when the E-IdP device 12 selects the service provider server device 1 based on the comparison of step 8 and one or more stored selection rules. The E-IdP device 12 sends a redirect message to the client device. In this example, the E-IdP device 12 redirects the requesting one of the client devices 16(1)-16(n) to the selected intended service provider server device 1 with the generated token for accessing one or more applications associated with the selected intended service provider server device 1. The E-IdP device 12 may send a redirect request to the requesting one of the client devices 16(1)-16(n), which redirects the requesting one of the client devices 16(1)-16(n) to the selected intended service provider server device 1 with the generated token. As part of a registration process the E-IdP device 12 registers URI for each of the plurality of service provider server devices 1-n in the memory and based on a service provider server selected, the requesting one of the client devices 16(1)-16(n) are redirected back to the registered redirect URI associated with the selected service provider server devices. The redirect request redirects the requesting one of the client devices 16(1)-16(n) to the selected intended service provider server device 1 with the token for accessing one or more applications associated with the selected intended service provider server device 1.

With this technology, load balancing of user traffic across multiple service providers is provided to select a service provider server based on multiple parameters for servicing user access request. Additional advantages of this technology include improved availability and manageability of applications by providing optimized load balancing and servicing of requests to select a service provider based on current status of network utilization dynamically and intelligently to provide optimal end-user experience.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for load balancing in a federated identity environment implemented by a network traffic management system comprising one or more identity provider server devices, service provider server devices, backend application server devices or client devices, the method comprising:

receiving a redirected authentication request from a client requesting access to an intended service provider server device of a plurality of service provider server devices, the authentication request originating from the intended service provider server device and being redirected through the client;

generating a token in response to successfully authenticating the authentication request;

comparing one or more network parameter values of the intended service provider server device against one or more network parameter values associated with each of the other service provider server devices of the plurality of service provider server devices;

selecting a different service provider server device from among the other service provider server devices based on the comparison and one or more selection rules; and in response to successfully authenticating the authentication request, redirecting the client request to the selected different service provider server device instead of the intended service provider server device, and sending the generated token for accessing one or more applications associated with the selected different service provider server device to the client.

2. The method of claim 1, wherein the one or more network parameter values of a respective service provider server device comprises a current load parameter value indicative of a load capacity of the respective service provider server device.

3. The method of claim 1, wherein the one or more network parameter values of a respective service provider server device comprises a health parameter value indicative of a hardware failure of the respective service provider server device.

4. The method of claim 1, wherein the one or more network parameter values of a respective service provider server device comprises a geographic location parameter value indicative of a distance between a geographic location of the intended service provider server device and the respective service provider server device.

5. The method of claim 1, further comprising registering a uniform resource identifier (URI) for each of the plurality of service provider server devices with an identity provider, and wherein the client request is redirected to the selected different service provider server device using the registered URI of the selected different service provider server device.

6. An identity provider apparatus, comprising a memory with programmed instructions stored thereon and one or more processors configured to be capable of executing the stored programmed instructions to:
receive a redirected authentication request from a client requesting access to an intended service provider server device of a plurality of service provider server devices, the authentication request originating from the intended service provider server device and being redirected through the client;
generate a token in response to successfully authenticating the authentication request;
compare one or more network parameter values of the intended service provider server device against one or more network parameter values associated with each of the other service provider server devices of the plurality of service provider server devices;
select a different service provider server device from among the other service provider server devices based on the comparison and one or more selection rules; and
in response to successfully authenticating the authentication request, redirect the client request to the selected different service provider server device instead of the intended service provider server device, and sending the generated token for accessing one or more applications associated with the selected different service provider server device to the client.

7. The apparatus of claim 6, wherein the one or more network parameter values of a respective service provider server device comprises a current load parameter value indicative of a load capacity of the respective service provider server device.

8. The apparatus of claim 7, wherein the one or more network parameter values of a respective service provider server device comprises a health parameter value indicative of a hardware failure of the respective service provider server device.

9. The apparatus of claim 7, wherein the one or more network parameter values of a respective service provider server device comprises a geographic location parameter value indicative of a distance between a geographic location of the intended service provider server device and the respective service provider server device.

10. The apparatus of claim 7, wherein the one or more processors are further configured to be capable of executing the stored programmed instructions to:
register a uniform resource identifier (URI) for each of the plurality of service provider server devices with the identity provider apparatus, and wherein the client request is redirected to the selected different service provider server device using the registered URI of the selected different service provider server device.

11. A non-transitory computer readable medium having stored thereon instructions for load balancing in a federated identity environment comprising executable code which when executed by one or more processors, causes the one or more processors to:
receive a redirected authentication request from a client requesting access to an intended service provider server device of a plurality of service provider server devices, the authentication request originating from the intended service provider server device and being redirected through the client;
generate a token in response to successfully authenticating the authentication request;
compare one or more network parameter values of the intended service provider server device against one or more network parameter values associated with each of the other service provider server devices of the plurality of service provider server devices;
select a different service provider server device from among the other service provider server devices based on the comparison and one or more selection rules; and
in response to successfully authenticating the authentication request, redirect the client request to the selected different service provider server device instead of the intended service provider server device, and sending the generated token for accessing one or more applications associated with the selected different service provider server device to the client.

12. The non-transitory computer readable medium of claim 11, wherein the one or more network parameter values of a respective service provider server device comprises a current load parameter value indicative of a load capacity of the respective service provider server device.

13. The non-transitory computer readable medium of claim 12, wherein the one or more network parameter values of a respective service provider server device comprises a health parameter value indicative of a hardware failure of the respective service provider server device.

14. The non-transitory computer readable medium of claim 12, wherein the one or more network parameter values of a respective service provider server device comprises a geographic location parameter value indicative of a distance between a geographic location of the intended service provider server device and the respective service provider server device.

15. The non-transitory computer readable medium of claim 12, wherein the executable code when executed by the one or more processors further causes the one or more processors to:
register a uniform resource identifier (URI) for each of the plurality of service provider server devices with an identity provider, and wherein the client request is redirected to the selected different service provider server device using the registered URI of the selected different service provider server device.

16. A network traffic management system, comprising one or more traffic management apparatuses, client devices, or server devices, the network traffic management system comprising memory comprising programmed instructions stored thereon and one or more processors configured to be capable of executing the stored programmed instructions to:

- receive a redirected authentication request from a client requesting access to an intended service provider server device of a plurality of service provider server devices, the authentication request originating from the intended service provider server device and being redirected through the client;
- generate a token in response to successfully authenticating the authentication request;
- compare one or more network parameter values of the intended service provider server device against one or more network parameter values associated with each of the other service provider server devices of the plurality of service provider server devices;
- select a different service provider server device from among the other service provider server devices based on the comparison and one or more selection rules; and
- in response to successfully authenticating the authentication request, redirect the client request to the selected different service provider server device instead of the intended service provider server device, and sending the generated token for accessing one or more applications associated with the selected different service provider server device to the client.

17. The network traffic management system of claim 16, wherein the one or more network parameter values of a respective service provider server device comprises a current load parameter value indicative of a load capacity of the respective service provider server device.

18. The network traffic management system of claim 17, wherein the one or more network parameter values of a respective service provider server device comprises a health parameter value indicative of a hardware failure of the respective service provider server device.

19. The network traffic management system of claim 17, wherein the one or more network parameter values of a respective service provider server device comprises a geographic location parameter value indicative of a distance between a geographic location of the intended service provider server device and the respective service provider server device.

20. The network traffic management system of claim 17, wherein the one or more processors are further configured to be capable of executing the stored programmed instructions to:

- register a uniform resource identifier (URI) for each of the plurality of service provider server devices with an identity provider, and wherein the client request is redirected to the selected different service provider server device using the registered URI of the selected different service provider server device.

* * * * *